United States Patent
Fogaça et al.

(10) Patent No.: US 12,505,274 B1
(45) Date of Patent: Dec. 23, 2025

(54) DETECTING AND MODELING VIA DURING GLOBAL ROUTING

(71) Applicant: Cadence Design Systems, Inc., San Jose, CA (US)

(72) Inventors: Mateus Paiva Fogaça, Porto Alegre (BR); Gracieli Posser, Austin, TX (US); Mehmet Can Yildiz, Austin, TX (US); Charles Jay Alpert, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 583 days.

(21) Appl. No.: 18/106,301

(22) Filed: Feb. 6, 2023

(51) Int. Cl.
*G06F 30/30* (2020.01)
*G06F 30/31* (2020.01)
*G06F 30/3947* (2020.01)
*G06F 30/398* (2020.01)

(52) U.S. Cl.
CPC .......... *G06F 30/3947* (2020.01); *G06F 30/31* (2020.01); *G06F 30/398* (2020.01)

(58) Field of Classification Search
CPC ..... G06F 30/3947; G06F 30/31; G06F 30/398
See application file for complete search history.

(56) References Cited

U.S. PATENT DOCUMENTS

| | | | | |
|---|---|---|---|---|
| 10,664,642 | B1 * | 5/2020 | Peyer | G06F 30/394 |
| 10,885,257 | B1 * | 1/2021 | Posser | G06F 30/398 |
| 11,734,485 | B1 * | 8/2023 | Posser | G06F 30/392 |
| | | | | 716/129 |
| 2009/0193374 | A1 * | 7/2009 | Fujimoto | G06F 30/3312 |
| | | | | 716/113 |

* cited by examiner

*Primary Examiner* — Jack Chiang
*Assistant Examiner* — Brandon Bowers
(74) *Attorney, Agent, or Firm* — Schwegman Lundberg & Woessner, P.A.

(57) ABSTRACT

Various embodiments provide for detecting and modeling vias of a circuit design during global routing, which may be part of electronic design automation (EDA). In particular, various embodiments described herein detect and model a big via during a global routing process, which can help mitigate or avoid minimum spacing violations by big vias.

20 Claims, 9 Drawing Sheets

200

202 — ACCESS CIRCUIT DATA DESCRIBING VIA(S) AND LAYER(S) OF CIRCUIT DESIGN

204 — DETERMINE DEMAND(S) BY VIA(S) FOR LAYER(S)

206 — DETERMINE, BASED ON DETERMINED DEMAND(S), MAXIMUM DEMAND(S) BY VIA(S) FOR LAYER(S)

208 — REDUCE, BASED ON DETERMINED MAXIMUM DEMAND(S), ROUTING CAPACITY OF GRID CELL(S) OF SELECT LAYER

DETECTING AND MODELING VIA DURING GLOBAL ROUTING

TECHNICAL FIELD

Embodiments described herein relate to circuit design and, more particularly, to systems, methods, devices, and instructions for detecting and modeling vias of a circuit design during global routing, which may be part of electronic design automation (EDA).

BACKGROUND

Electronic design automation (EDA) software systems commonly perform routing of networks of circuit designs, such as clock networks (hereafter, clock nets). Usually, a network of a circuit design comprises a set of pins, and a routing process can route a path to connect the network. Net routing can be performed in two phases, where the first phase involves routing guides (e.g., global routing paths) that attempt to generate timing-aware/timing-based global routing of nets, and the second phase involves detailed routing of nets with specific wires (e.g., metal traces) based on the routing guides, while attempting to resolve/avoid one or more design rule violations.

BRIEF DESCRIPTION OF THE DRAWINGS

Various ones of the appended drawings merely illustrate various embodiments of the present disclosure and should not be considered as limiting its scope.

DETAILED DESCRIPTION

Figure 1:
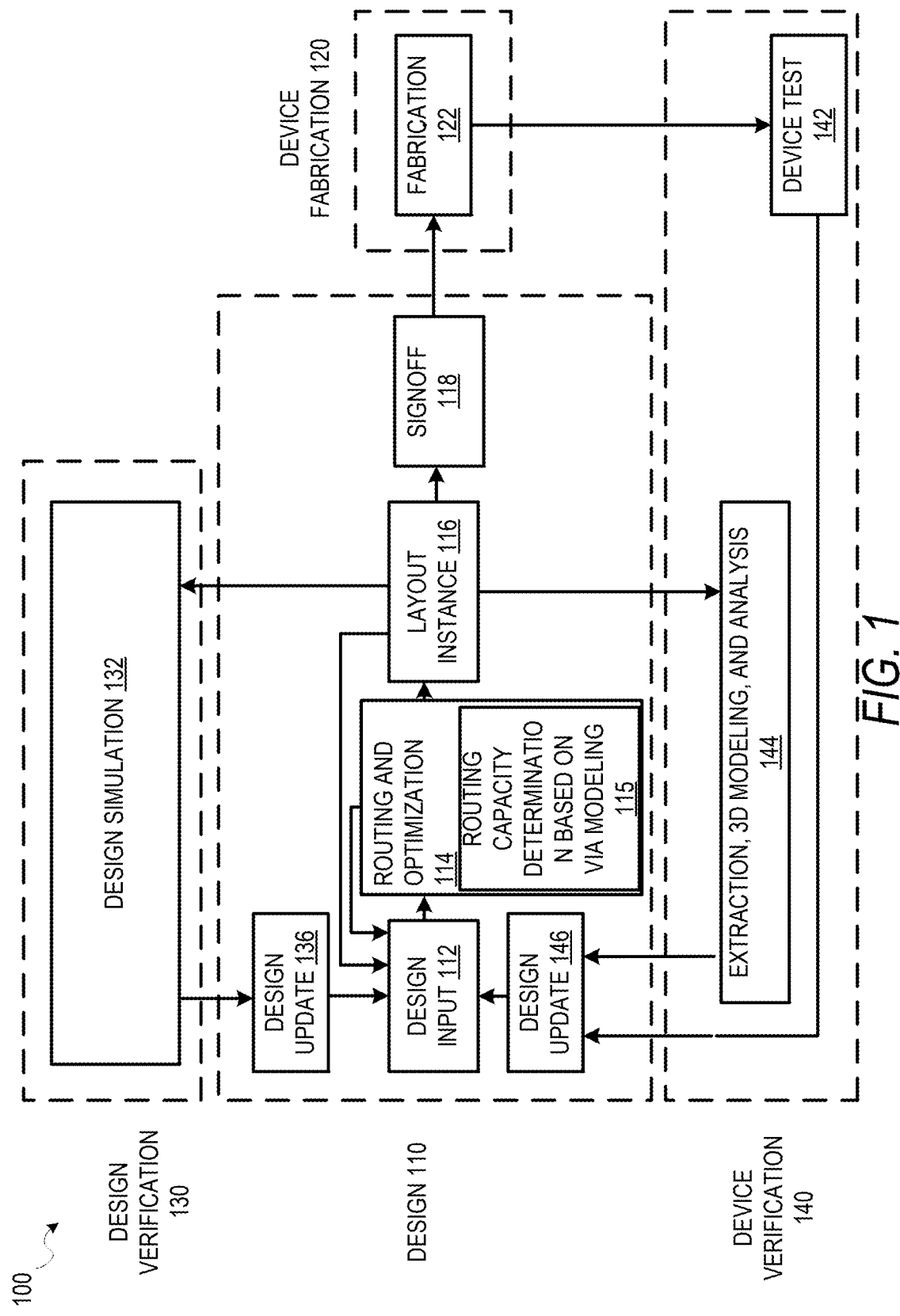
FIG. 1 is a diagram illustrating an example design process flow for detecting and modeling via of a circuit design during a global routing process, according to some embodiments.

Traditionally, global routing comprises two-dimensional (2D) net routing, layer assignment of wires of nets, or track assignment of wires of nets. Resolving congestion and major design rule constraints (DRCs) during global routing can facilitate detailed routing of nets. Conventional global routing can route nets of a circuit design by dividing the circuit design (e.g., each layer of the circuit design) into a grid of cells (also referred to as "global routing cells," "grid cell," or "g-cells"), where each grid cell comprises a set number of resources (e.g., horizontal and vertical resources, such as tracks) for routing a net, referred to as capacity, and a number of resources that are currently being used or demanded by global routing to route a network, referred to as demand. A cell can be square or rectangle in shape. Overflow for a given grid cell is usually determined by subtracting the demand for the given grid from the capacity of the given grid, where an overflow comprising a negative number indicates more demand for routing resources than available capacity of resources. A grid cell can be considered congested if the number of resources of the grid cell is less than what is needed to route a network through the grid cell, which is indicated by a negative number for overflow.

Based on the grid of cells, global routing can route a net of the circuit design by assigning the net to a set of specific grid cells and a set of specific layers (metal layer) of the circuit design. Generally, using grid cells permits global routing to speed up the process of finding the net routing solutions by analyzing routing congestion based on grid cell congestion and by reducing the number of pathways to consider for net routing.

Generally, wires that connect nodes of a circuit design are routed by way of two or more metal layers of the circuit design, where the adjacent metal layers are separated by an insulator (e.g., insulator layer). Additionally, a via can connect two or more wires disposed on two different metal layers. To physically fabricate (e.g., implement) a via in a physical circuit, usually a first mask is used to form a first enclosure of the via on a lower metal layer, a second mask is used to form a second enclosure of the via on an upper metal layer, and a third mark is used to form a cut through an insulation layer between the upper and lower metal layers, where the cut results in the via between the two enclosures. In this way, a via can serve as a cut shape. As used herein, an enclosure (or via enclosure) can comprise a shape (e.g., rectangle shape) on a metal layer that has a minimum dimension (e.g., width). While a regular via (e.g., non-big via) is a via having enclosure masks that respect such minimum spacing rules, a big via is a via that has at least one enclosure mask that does not respect at least one (e.g., any) minimum spacing rule. Unfortunately, global routing processes do not typically have knowledge of track assignments of wires and thus are unable to address (e.g., mitigate or avoid) minimum spacing violations by big vias. Further, violations by big vias only get worse with nodes (e.g., technology) getting smaller, and big vias usually happen when there are pitch differences between two or more layers.

According to some embodiments, vias of a circuit design are detected and modeled during global routing, which may be part of electronic design automation (EDA). In particular, various embodiments described herein detect and model a big via during (e.g., as part of) a global routing process, which can help mitigate or avoid minimum spacing violations by big vias, such as violations detected during a subsequent detailed routing process. For some embodiments, a via (e.g., big via) is modeled during a global routing process by reducing routing capacity of one or more grid cells (Gcells) of one or more layers of a circuit design. For instance, an embodiment can determine (e.g., compute), for each via, a demand for a lower layer for a lower enclosure of the via and a demand for an upper layer for an upper enclosure of the via. The embodiment can determine (e.g., compute), for each layer, a capacity to remove based on a maximum demand for an enclosure of a via on the layer, based on an operation mode, a user modeling ratio, or some combination thereof. Based on the determined capacity removal, the embodiment can adjust (e.g., reduce or remove) routing capacity for one or more grid cells (Gcells) of one or more layers of the circuit design. By detecting and modeling vias (e.g., big vias) in this manner, an embodiment can provide a more accurate congestion map, which can subsequently be used by a routing process (e.g., the global routing process). Depending on the embodiment, a routing capacity of a grid cell can be reduced by: reducing a routing capacity only in an enclosure mask layer of a via (e.g., all of the enclosure mask layer); reducing a routing capacity of the enclosure mask layer (e.g., all of the enclosure mask layer) and a layer immediately above the enclosure mask layer; and reducing a routing capacity in a specific layer associated with the via and gradually reducing routing capacities of one or more (e.g., all) layers above the specific layer. Additionally, for some embodiments, a user (e.g., of an EDA) can use (e.g., define) a modeling factor (e.g., different modeling factor for each layer) to increase or decrease the amount of demand removed from a layer in response to detecting a big via.

Depending on the embodiment, a determined (e.g., reduced) routing capacity of an individual grid cell of an individual layer of a circuit design can be written to/stored in (e.g., represented within) a capacity map of the circuit design. For some embodiments, a capacity map of a circuit design is used by a global routing process to generate a set of routing guides between at least two nodes of the circuit design (e.g., between two pins or between a source and a pin). For some embodiments, the detecting and modeling vias is performed as part of global routing and prior to detailed routing.

As used herein, global routing can comprise determining a routing plan (e.g., one or more routing guides) for routing a physical wire (e.g., interconnect line or wire) within a circuit design between two or more nodes of circuit design (e.g., two pins or a source and a pin). For instance, global routing can route a wire (of a net of the circuit design) within the circuit design by dividing the circuit design (e.g., dividing each of one or more layers of the circuit design) into a grid of cells (e.g., grid cells), where each cell comprises a set number of resources (e.g., horizontal and vertical resources, such as tracks) for routing the wire. For some embodiments, each layer of a circuit design comprises its own grid of cells (e.g., grid cells). Additionally, for some embodiments, a routing blockage of a circuit design (e.g., on a layer of the circuit design) is marked with respect to a cell (e.g., grid cell) in the grid. Global routing can consider/account for one or more routing blockages of the circuit design when determining a route plan for a wire within the circuit design.

Global routing can route a wire (of the net) by assigning the net to a set of specific cells and a set of specific layers (metal layers) of the circuit design. In doing so, global routing can generate a routing plan for the wire that describes a set of connected cells (e.g., grid cells), between two or more nodes of the circuit design, that does not include obstructed cells. The routing plan (e.g., global routing plan) can comprise one or more routing guides that serve as "loose" routing paths or routing areas within which detailed routing can route a physical wire between two or more nodes (e.g., pins) of a circuit design.

As used herein, detailed routing can comprise routing a physical wire (e.g., interconnect wire) within a circuit design, between two or more nodes of the circuit design, based on a routing plan determined by global routing for the circuit design. The routing plan can provide a detailed routing process with a topology for routing wires, which in turn can enable detailed routing to route wires without violating one or more design rule constraints (DRCs) associated with a circuit design. This can be referred to as detailed routing being performed with clean DRCs. Accordingly, for some embodiments, global routing is performed on a circuit design prior to detailed routing being performed on the circuit design. Generally, global routing can be performed on a circuit design faster than performing detailed routing on the same circuit design. The routed wires of a circuit design can form a network of the circuit design.

As used herein, a capacity map can describe a measure of routing resource capacity of a set of grid cells for layer(s) of a circuit design, such as horizontal and vertical resources (e.g., tracks) for routing a wire through each grid cell. For some embodiments, a capacity map is used by global routing to generate a set of routing guides between at least two nodes of the circuit design (e.g., between two pins or between a source and a pin). A capacity map for a circuit design can be generated based on a routing resource capacity (or routing capacity) of a set of grid cells for one or more layers of the circuit design.

As used herein, a congestion map can describe a measure (e.g., estimated measure) of routing congestion for a set of grid cells on layer(s) (e.g., metal layers) of a circuit design, where the layers serve as interconnect structures for the circuit design. A measure of routing congestion for a given grid cell can be represented by one or more congestion ratios, such as one ratio for a horizontal routing resource and another ratio for a vertical routing resource. For example, a congestion ratio for a horizontal routing resource of a given grid can comprise a total number of horizontal routing resources demanded from the given grid cell by circuit elements (e.g., logical devices of the circuit design) within the given grid cell, divided by a total number of horizontal routing resources available (supplied) by the given grid cell. A congestion map can be implemented as a data structure, such as a two-dimensional array, for storing measured interconnect congestion for individual cells of the set of grid cells.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for detecting and modeling via during a global routing process, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. Though not shown, the routing and optimization 114 operation can include a clock tree synthesis (CTS) operation, which can generate one or more clock trees that deliver clock signal from clock sources of a circuit design to a plurality of clock tree leaf nodes comprising clock tree pins (e.g., of circuit devices, such as flip-flops) within the circuit design. The routing and optimization 114 operation may also include other operations not shown, such as those relating to floorplanning, placement, post-placement optimization, and post-routing optimization. As shown, the routing and optimization 114 operation includes a routing capacity determination based on via modeling operation 115, which may be performed in accordance with various embodiments described herein. For some embodiments, operation 115 can be performed prior to detailed routing of a circuit design and, more particularly, during (e.g., as part of) global routing of the circuit design. For example, during operation 115, an embodiment can determine (e.g., compute), for each of one or more vias of a circuit design, a demand for a lower (or bottom) enclosure and an upper (or top) enclosure of a via. Based on these determined demands, a maximum demand by any enclosure can be determined (e.g., identified) for each layer of the circuit design. The determined (e.g., identified) maximum demands can be used to determine an amount of routing capacity to be removed (e.g., how many tracks to block) in one or more grid cells of each layer. In particular, routing capacity (e.g., reduced routing capacity) can be determined (e.g., computed) for individual grid cells of individual layers based on the amount of routing capacity determined to be removed. For some embodiments, the determination of the routing capacity for an individual grid cell comprises adjustment of an existing routing capacity of the individual grid cell.

While the design process flow 100 shows optimization occurring prior to a layout instance 116, timing analysis and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

Design inputs are used in the design input 112 operation to generate an initial circuit layout. The design inputs may be further processed during the design input 112 operation via a process, such as logic-synthesis, to generate a circuit netlist mapped to a target standard library manufacturable by the foundry in fabrication 122 operation. After design inputs are used in the design input 112 operation to generate an initial circuit layout, and any of the routing and optimization 114 operations are performed, a resulting layout is generated as the layout instance 116. The netlist as placed by the layout instance 116 describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, a design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

FIGS. 2 through 5 are flowcharts illustrating example methods for detecting and modeling via of a circuit design during a global routing process, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Figure 2:
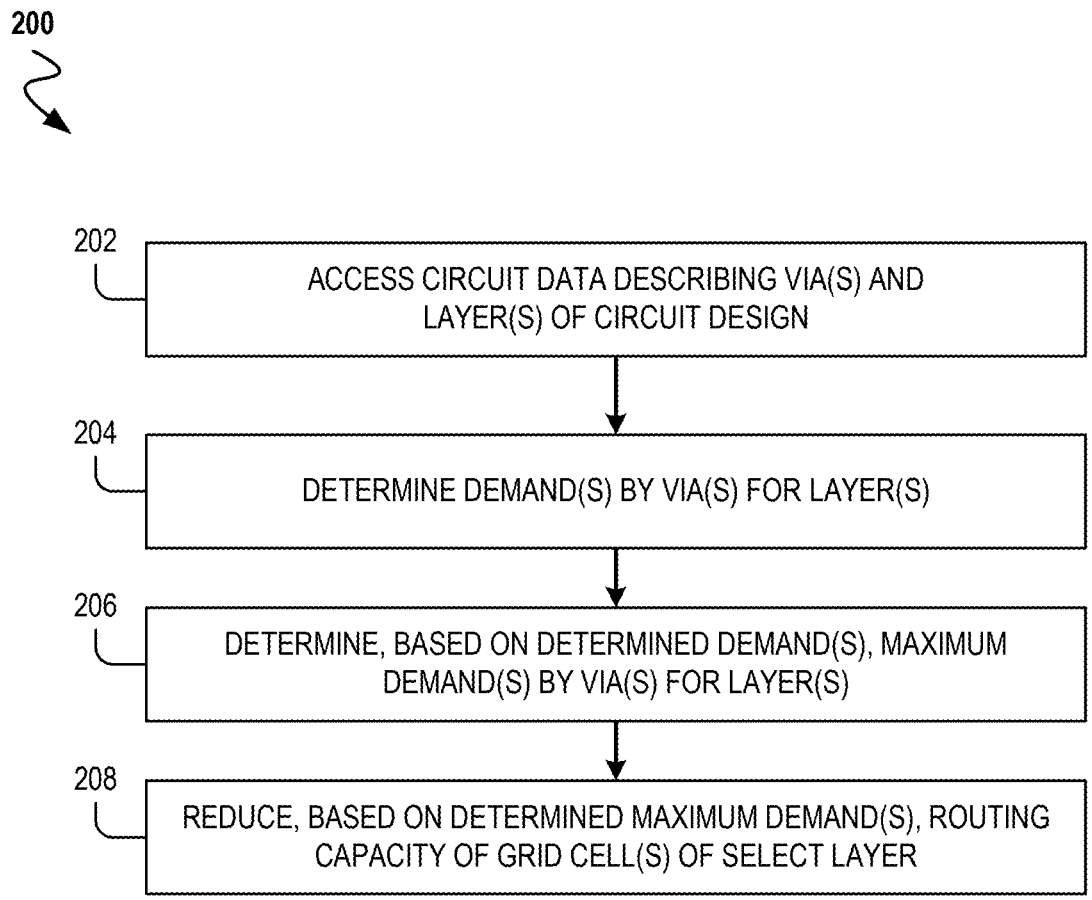
FIGS. 2 through 5 are flowcharts illustrating example methods for detecting and modeling via of a circuit design during a global routing process, according to some embodiments.

Referring now to FIG. 2, the flowchart illustrates an example method 200 for detecting and modeling via of a circuit design during a global routing process, according to some embodiments. For some embodiments, the method 200 is performed as part of a global routing process with respect to a circuit design (e.g., by an EDA software system). An operation of the method 200 (or another method described herein) may be performed by a hardware processor (e.g., central processing unit or graphics processing unit) of a computing device (e.g., desktop, server, etc.).

As illustrated, operation 202 of the method 200 accesses circuit data that describes a set of layers (e.g., all layers) of a circuit design, and a set of vias of the circuit design between one or more of the set of layers. The circuit data can be data describing, without limitation, one or more of grid cell locations, a layer stack (e.g., comprising layers at different horizontal levels), via locations, and via enclosure information.

The method 200 continues with operation 204 determining, based on the circuit data accessed by operation 202, a set of demands by the set of vias for the set of layers. For some embodiments, operation 204 comprises determining, for a select via of the set of vias, a lower demand of a lower layer enclosure (e.g., bottom via enclosure) of the select via on a lower layer and an upper demand of an upper layer enclosure (e.g., top via enclosure) of the select via on an upper layer. This determination can be performed for each via of the set of vias, thereby resulting in a lower demand of a lower layer enclosure of each via, and an upper demand of an upper layer enclosure of each via. Determining the lower demand of the lower layer enclosure of the select via can comprise determining a number of tracks blocked on the lower layer by the lower layer enclosure of the select via, and determining the upper demand of the upper layer enclosure of the select via can comprise determining a number of tracks blocked on the upper layer by the upper layer enclosure of the select via. For some embodiments, the lower demand of the lower layer enclosure of the select via is determined by a following Equation 1:

$$2 \times \frac{\left(\frac{EW_l}{2} + WS_l + \frac{DW_l}{2}\right)}{P_l},$$

where $EW_l$ is a width of the lower layer enclosure of the select via on the lower layer, $WS_l$ is a wire default width of the lower layer, $DW_l$ is a default width of the lower layer, and $P_l$ is a pitch of the lower layer. Likewise, for some embodiments, the upper demand of the upper layer enclosure of the select via is determined by the following Equation 2:

$$2 \times \frac{\left(\frac{EW_l}{2} + WS_l + \frac{DW_l}{2}\right)}{P_l},$$

where $EW_l$ is a width of the upper layer enclosure of the select via on the upper layer, $WS_l$ is a wire default width of the upper layer, $DW_l$ is a default width of the upper layer, and $P_l$ is a pitch of the upper layer. More regarding an example implementation of operation 204 is described with respect to FIG. 3.

Operation 206 of method 200 determines, based on the set of demands determined by operation 204, a set of maximum demands by the set of vias for the set of layers. For some embodiments, operation 206 comprises determining, for each individual layer of the set of layers, a largest demand of all enclosures of vias on the individual layer. This determination can be performed for layer via of the set of layers, thereby resulting in the set of maximum demands corresponding to the set of layers (e.g., one maximum demand per layer). More regarding an example implementation of operation 206 is described with respect to FIG. 4.

The method 200 continues with operation 208 reducing, based on the set of maximum demands, a routing capacity of one or more grid cells of a select layer of the set of layers. For some embodiments, an operation mode determines how operation 208 is performed. For instance, depending on the operation mode, operation 208 can reduce a routing capacity of one or more grid cells in a mask layer of an enclosure of a via, reduce a routing capacity of one or more grid cells in the mask layer of the enclosure of the via and a layer above, or reduce a routing capacity of one or more grid cells of a specific layer and one or more (e.g., all) upper layers gradually. Accordingly, operation 208 can comprise reducing, based on the set of maximum demands, the routing capacity of one or more grid cells of the select layer of the set of layers, of the select layer and of an additional layer of the set of layers disposed above the select layer, or of the select layer of the set of layers and of all layers of the set of layers disposed above the select layer. According to some embodiments, a select routing capacity of a select grid cell of the select layer is determined by a following Equation 3:

$$\max(C_l - TB_l \times CPT_l \times F_l, CPT_l),$$

where $C_l$ is a present value of the select routing capacity of the select grid cell in the select layer, $TB_l$ is a maximum demand from the set of maximum demands (e.g., determined by operation 206) corresponding to the select layer, $F_l$ is a modeling factor for deciding how much demand to block in the select layer, and $CPT_l$ is a routing capacity per track in the select layer. For some embodiments, the modeling factor ($F_l$) is defined or determined for an individual layer, and determines how many units of demand will be removed for the individual layer when a big via is detected. A modeling factor of an individual layer can be user-defined, and can be used by a user to increase or decrease how many units of demand will be removed for a big via of the individual layer. Depending on the embodiment, a single modeling factor can be used for all layers, or different modeling factors can be used for different layers. For some embodiments, each routing capacity determined for an individual grid cell can be written to/stored in (e.g., represented within) a capacity map of the circuit design. Eventually, the capacity map can facilitate a more accurate congestion map of the circuit design, which can be used by a detailed routing process to route the circuit design. More regarding an example implementation of operation 208 is described with respect to FIG. 5.

Figure 3:
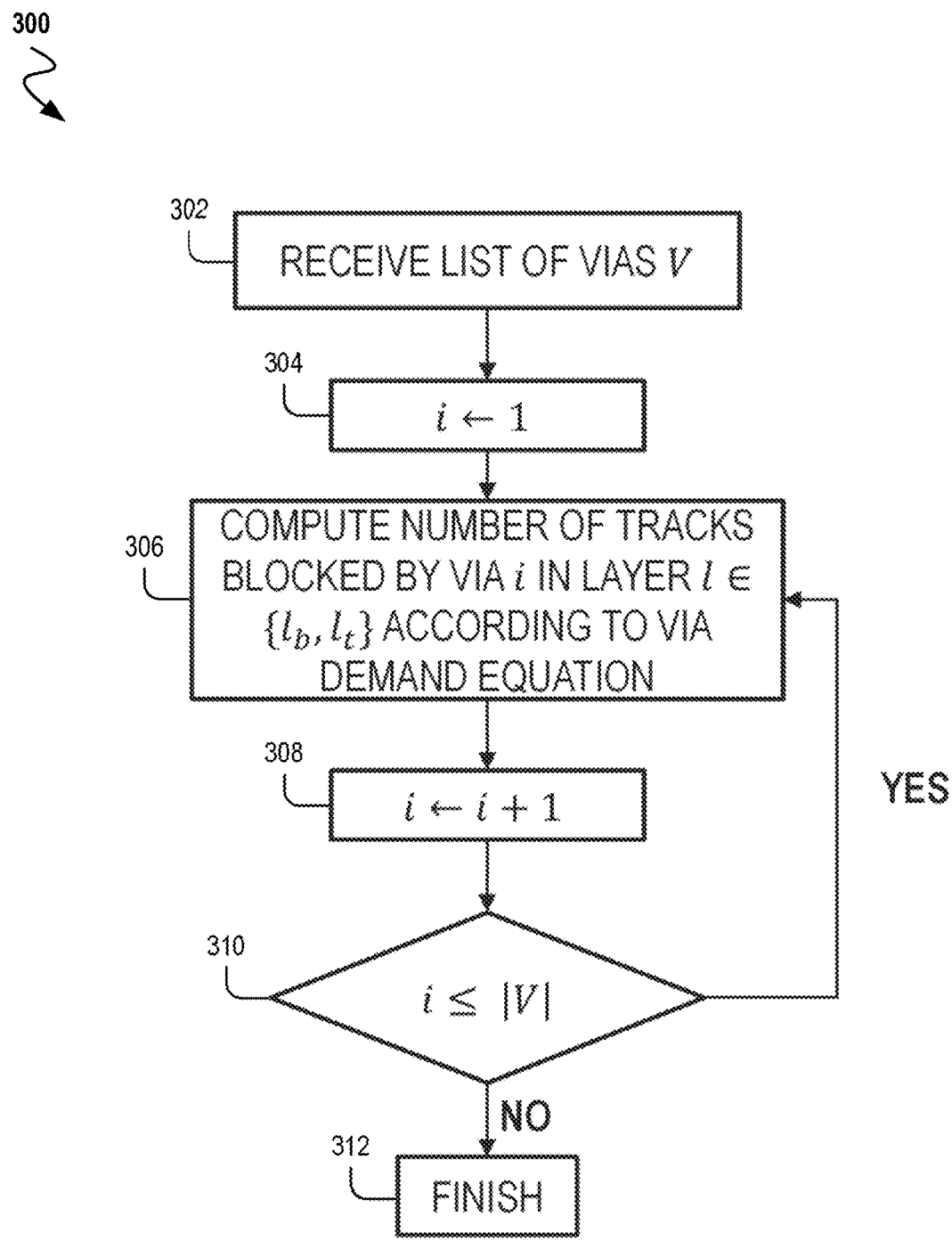

Referring now to FIG. 3, the flowchart illustrates an example method 300 that represents an implementation for determining a set of demands by a set of vias for a set of layers, according to some embodiments. For instance, the method 300 can represent an example implementation of operation 204 of FIG. 2. As illustrated, operation 302 of the method 300 receives a list of vias V of a circuit design, and operation 304 initializes variable i to a value of 1. Thereafter, at operation 306, a number of tracks blocked by an i-th via (of the list of vias V) is computed when layer l is a bottom layer $l_b$ and when the layer l is a top layer $l_t$, and computed based on a via demand equation that determines a via demand $TB_{i,l}$ for a bottom enclosure of the i-th via on the bottom layer $l_b$ and for a top enclosure of the i-th via on the top layer $i_t$. For some embodiments, the via demand equation (Equation 4) is defined as follows:

$$TB_{i,l} = 2 \times \frac{\left(\frac{EW_{i,l}}{2} + WS_l + \frac{DW_l}{2}\right)}{P_l}$$

where $EW_i$ is the enclosure width of the i-th via in the l-th layer, $WS_l$ is the wire default width of the l-th layer, $DW_l$ is the default width of the l-th layer, and $P_l$ is the pitch of the l-th layer. At operation 308, the variable i is incremented by 1 (to go to traverse to the next via in the list of vias). Operation 310 determines whether a current value of the variable i is less than or equal to a number of vias in the list of vias V(i.e., i≤|V|). If yes, the method 300 returns to operation 306, otherwise the method 300 proceeds to operation 312 where the method 300 finishes. By performance of the method 300, the method 300 can traverse through and process each via of the circuit design.

Figure 4:
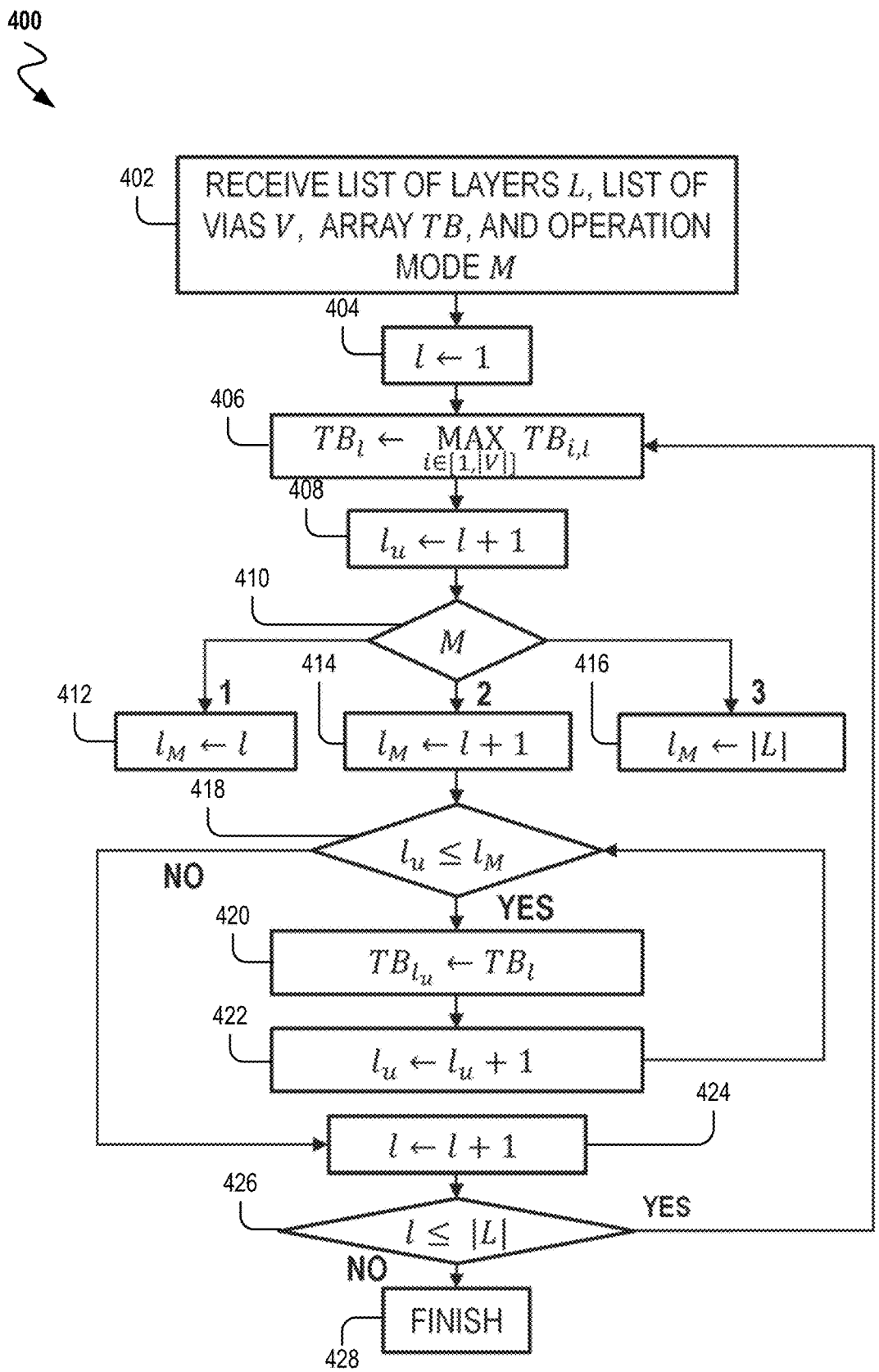

Referring now to FIG. 4, the flowchart illustrates an example method 400 that represents an implementation for determining, based on a set of demands, a set of maximum demands by a set of vias for a set of layers, according to some embodiments. For instance, the method 400 can represent an example implementation of operation 206 of FIG. 2. As illustrated, operation 402 of the method 400 receives a list of layers l, a list of vias V of a circuit design, an array of via demands TB (e.g., generated by the method 300 of FIG. 3), and an operation mode M. Operation 404 initializes variable l to a value of 1. Thereafter, at operation 406, a largest via demand between all via enclosure masks on a l-th layer is determined based on the following equation:

$$TB_l \leftarrow \max_{i \in [1,|V|]} TB_{i,l},$$

where $TB_{i,l}$ is obtained from the array of via demands TB.

At operation 408, a variable $l_u$ for an upper layer is set to the value of variable l plus 1 (i.e., $l_u \leftarrow l+1$), and the method 400 proceeds to operation 410, where a value of the operation mode M is determined. For some embodiments, where the operation mode value has a value of 1 (e.g., representing a first reduction operation mode), routing capacity is only reduced in an enclosure mask layer and the method 400 proceeds to operation 412, where a variable $l_M$ is set to a value of 1. Where the operation mode value has a value of 2 (e.g., representing a second reduction operation mode), routing capacity is reduced in an enclosure mask layer and the layer above that layer and the method 400 proceeds to operation 414, where the variable $l_M$ is set to a value of 1 plus the current value of the variable l. Where the operation mode value has a value of 3 (e.g., representing a third reduction operation mode), routing capacity is reduced for s specific layer and all upper layers gradually, and the method 400 proceeds to operation 416, where the variable $l_M$ is set to the number of layers in the list of layers L.

After operation 416 is performed, the method 400 proceeds to operation 418, where it is determined whether the variable $l_u$ is less than or equal to the variable $l_M$ (i.e., $l_u \leq l_M$). If yes, the method 400 proceeds to operation 420, otherwise the method 400 proceeds to operation 424. During operation 420, a largest via demand $TB_{l_u}$ of an upper layer is set to the largest via demand $TB_{l_u}$ of the l-th layer. Then, at operation 422, the variable $l_u$ is incremented by 1 to traverse to a next upper layer, and the method 400 returns to operation 418.

At operation 424, the variable l is incremented by 1 to traverse to a layer, and the method 400 returns to operation 426. Operation 426 determines whether the variable l is less than or equal to the count of layers in the list of layers L (i.e., $l \leq |L|$). If yes, the method 400 returns to operation 406, otherwise the method 400 proceeds to operation 428, where the method 400 finishes. By performance of the method 400, the method 400 can traverse through and process each layer of the circuit design.

Figure 5:
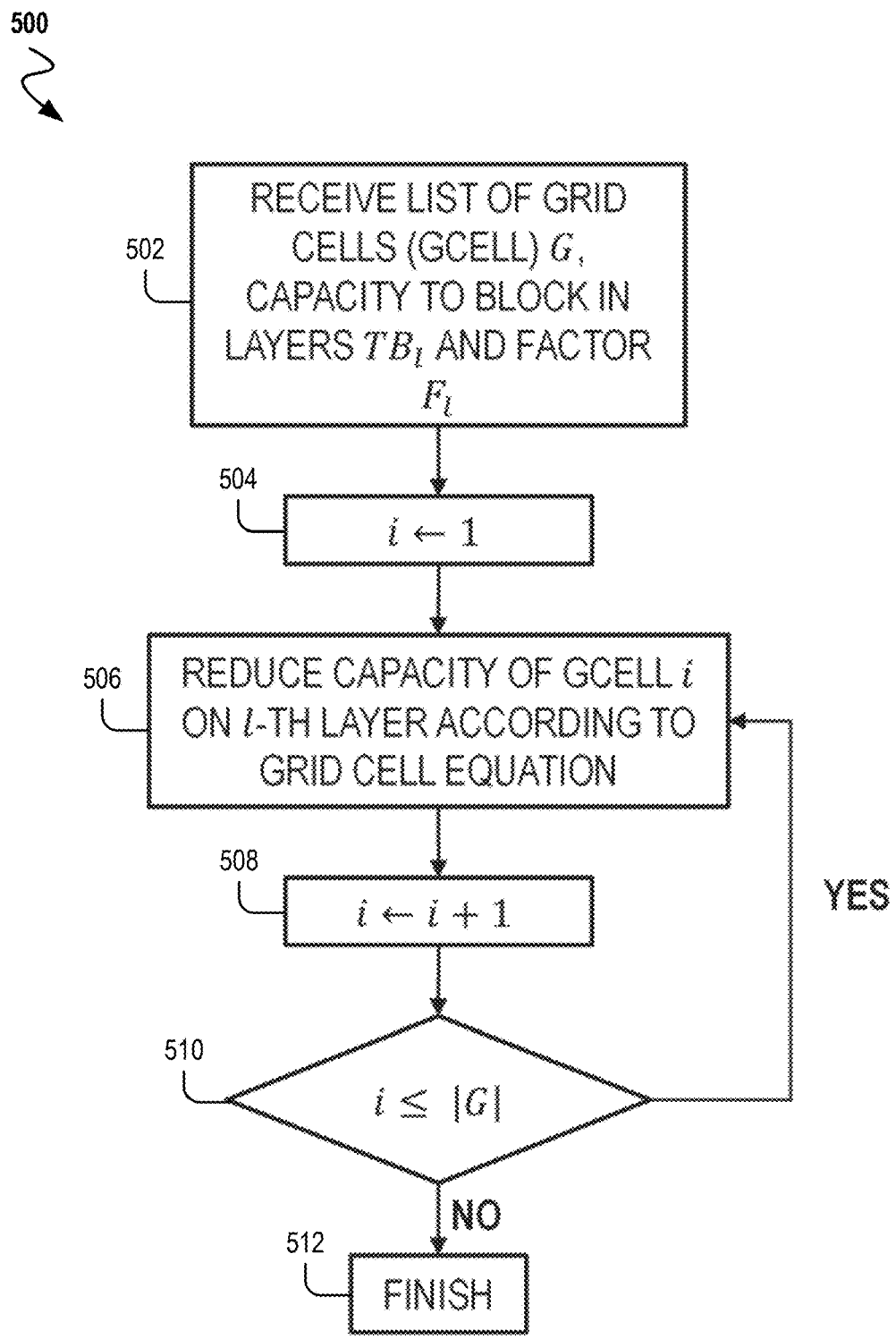

Referring now to FIG. 5, the flowchart illustrates an example method 500 that represents an implementation for reducing, based on a set of maximum demands, a routing capacity of one or more grid cells of a select layer of a set of layers, according to some embodiments. For instance, the method 500 can represent an example implementation of operation 208 of FIG. 2. As illustrated, operation 502 of the method 500 receives a list of grid cells G, routing capacity to block in layers $TB_l$ (as determined by the method 400 of FIG. 4), and a modeling factor F for the l-th layer, which is a modeling factor to increase or decrease the amount of demand removed from the l-th layer (e.g., in response to detecting a big via). Operation 504 initializes variable i to a value of 1. Thereafter, at operation 506, routing capacity $C_{i,l}$ of l-th grid cell on the 1-th layer is reduced according to a grid cell equation (Equation 5) as defined as follows:

$$C_{i,l} \leftarrow \max(C_{i,l} - TB_l \times CPT_l \times F_l, CPT_l),$$

where $C_{i,l}$ is the capacity of the i-th grid cell on the l-th layer, $TB_l$ is the demand to block on the l-th layer, $F_l$ is the modeling factor to decide the amount of demand to block on the l-th layer layer, and $CPT_l$ is the capacity per track in the l-th layer.

At operation 508, the variable i is incremented by 1 (to go to traverse to the next grid cell in the list of grid cells). Operation 510 determines whether a current value of the variable i is less than or equal to a number of grid cells in the list of grid cells G (i.e., $i \leq |G|$). If yes, the method 500 returns to operation 506, otherwise the method 500 proceeds to operation 512 where the method 500 finishes. By performance of the method 500, the method 500 can traverse through and process each grid cell of the circuit design.

Figure 6:
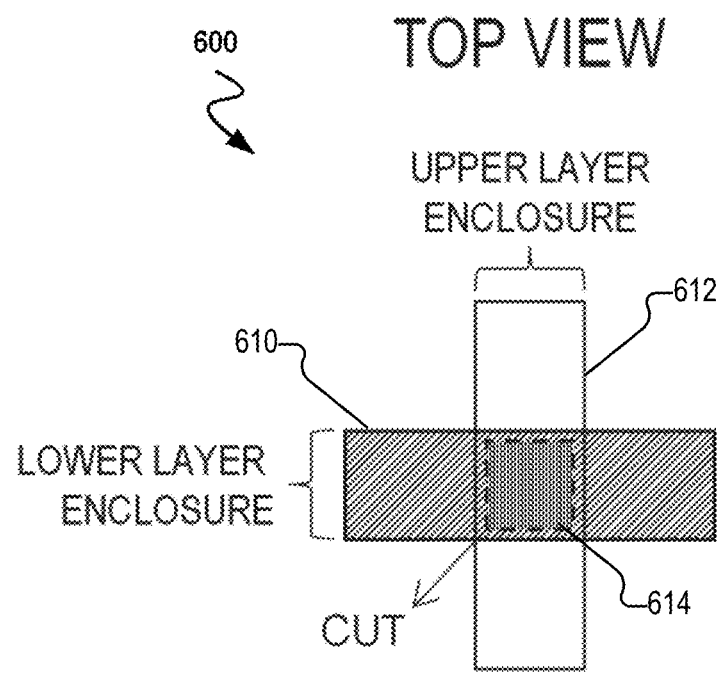
FIG. 6 is a diagram illustrating an example via and example enclosures of the via that can be processed, according to some embodiments.
Figure 6:
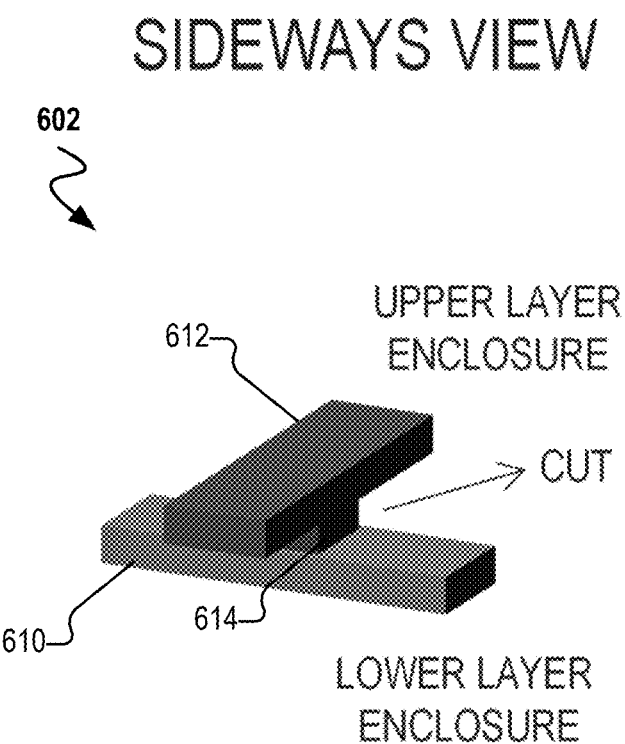

FIG. 6 is a diagram illustrating an example via and example enclosures of the via that can be processed, according to some embodiments. In particular, FIG. 6 presents a top view 600 and a sideways view 602 of an example via and example enclosures of the via. The top view 600 and the sideways view 602 illustrate an upper layer enclosure 610 of a via, a lower layer enclosure 612, and a cut 614 (through an insulation layer) through which a via is formed between the upper layer enclosure 610 and the lower layer enclosure 612.

Figure 7:
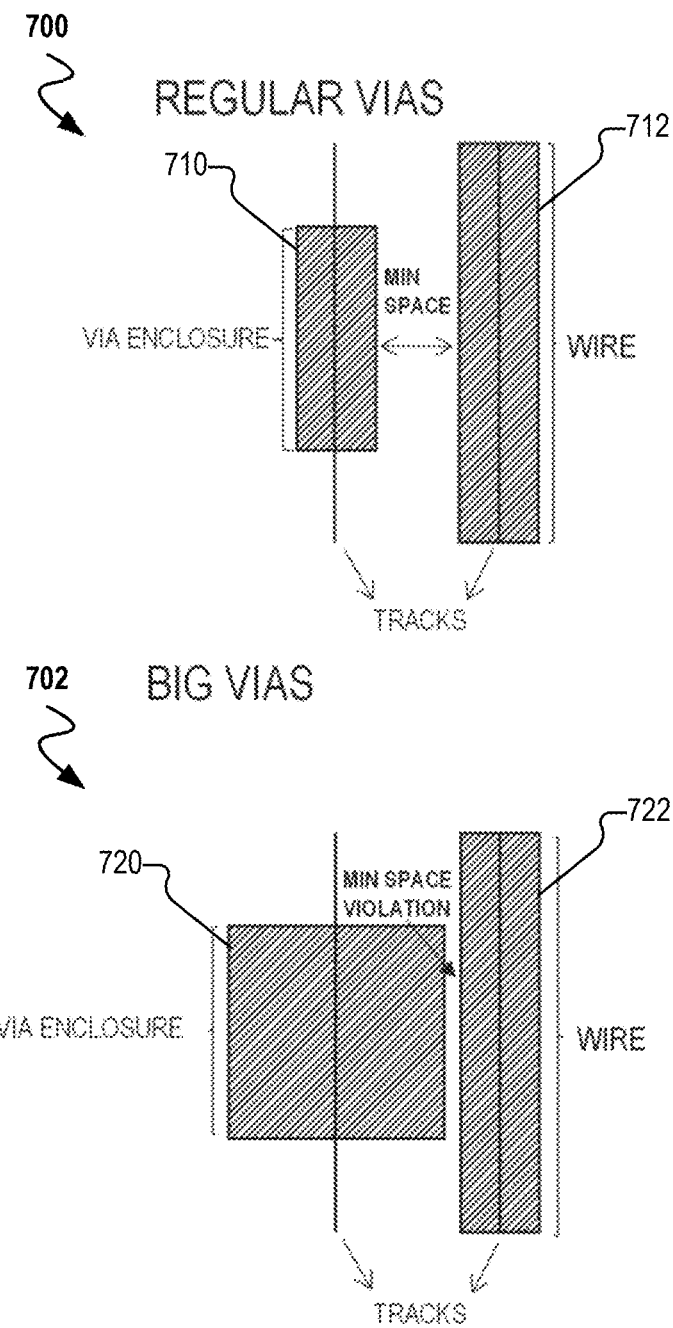
FIG. 7 is a diagram illustrating an example regular via and an example big via that can be processed, according to some embodiments.

FIG. 7 is a diagram illustrating an example regular via 700 and an example big via 702 that can be processed, according to some embodiments. In particular, with respect to the example regular via 700, a via enclosure 710 is disposed with a first track, a wire 712 is disposed on a second track, and the via enclosure 710 is shown to respect a minimum spacing rule between the via enclosure 710 and the wire 712. As the via enclosure 710 respects the minimum spacing rule with the wire 712, a via associated with the via enclosure 710 can be regarded as a regular via (e.g., non-big via). In contrast, with respect to the example big via 702, a via enclosure 720 is disposed with a first track, a wire 722 is disposed on a second track, and the via enclosure 720 is shown to violate the minimum spacing rule between the via enclosure 720 and the wire 722. As the via enclosure 720 violates the minimum spacing rule with the wire 722, a via associated with the via enclosure 720 can be regarded as a big via.

Figure 8:
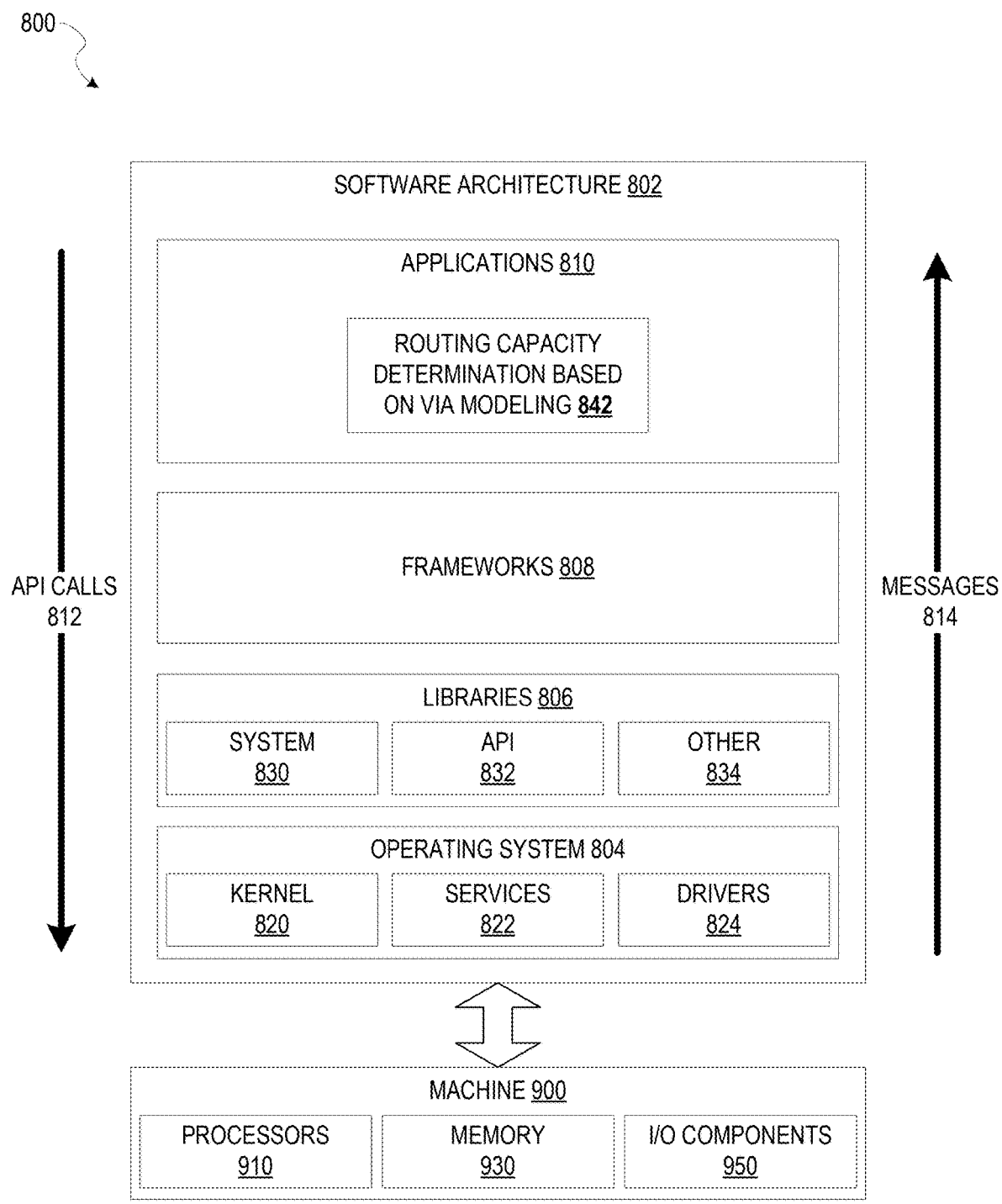
FIG. 8 is a block diagram illustrating an example of a software architecture that may be operating on an electronic design automation (EDA) computing device and may be used with methods for detecting and modeling via of a circuit design during a global routing process, according to some embodiments.

FIG. 8 is a block diagram 800 illustrating an example of a software architecture 802 that may be operating on an EDA computer and may be used with methods for detecting and modeling via of a circuit design during a global routing process, according to some embodiments. The software architecture 802 can be used as an EDA computing device to implement any of the methods described above. Aspects of the software architecture 802 may, in various embodiments, be used to store circuit designs, and to facilitate generation of a circuit design in an EDA environment by detecting and modeling via of a circuit design during a global routing process.

FIG. 8 is merely a non-limiting example of a software architecture 802, and it will be appreciated that many other architectures can be implemented to facilitate the functionality described herein. In various embodiments, the software architecture 802 is implemented by hardware such as a machine 900 of FIG. 9 that includes processors 910, memory 930, and I/O components 950. In this example, the software architecture 802 can be conceptualized as a stack of layers where each layer may provide a particular functionality. For example, the software architecture 802 includes layers such as an operating system 804, libraries 806, software frameworks 808, and applications 810. Operationally, the applications 810 invoke application programming interface (API) calls 812 through the software stack and receive messages 814 in response to the API calls 812, consistent with some embodiments. In various embodiments, any client device, any server computer of a server system, or any other device described herein may operate using elements of the software architecture 802. An EDA computing device described herein may additionally be implemented using aspects of the software architecture 802, with the software architecture 802 adapted for operating via detecting and modeling in any manner described herein.

In some embodiments, an EDA application of the applications 810 performs via detecting and modeling via according to embodiments described herein using various modules within the software architecture 802. For example, in some embodiments, an EDA computing device similar to the machine 900 includes the memory 930 and the one or more processors 910. The processors 910 also implement a routing capacity determination based on via modeling module 842 for detecting and modeling via of a circuit design during a global routing process, in accordance with various embodiments described herein.

In various other embodiments, rather than being implemented as modules of the one or more applications 810, the routing capacity determination based on via modeling module 842 may be implemented using elements of the libraries 806, the operating system 804, or the software frameworks 808.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 such as libraries of blocks for use in an EDA environment or other libraries that can provide functions such as memory allocation functions, string manipulation functions, mathematic functions, and the like. In addition, the libraries 806 can include API libraries 832 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 may also include other libraries 834.

The software frameworks 808 provide a high-level common infrastructure that can be utilized by the applications 810, according to some embodiments. For example, the software frameworks 808 provide various graphic user interface (GUI) functions, high-level resource management, high-level location services, and so forth. The software frameworks 808 can provide a broad spectrum of other APIs that can be utilized by the applications 810, some of which may be specific to a particular operating system 804 or platform. In various embodiments, the systems, methods, devices, and instructions described herein may use various files, macros, libraries, and other elements of an EDA design environment to implement via detecting and modeling as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 802, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 900 including processors 910), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 900, but deployed across a number of machines 900. In some embodiments, the processors 910 or processor-implemented modules are located in a single geographic location (e.g., within a home environment, an office environment, or a server farm). In some other embodiments, the processors or processor-implemented modules are distributed across a number of geographic locations.

Figure 9:
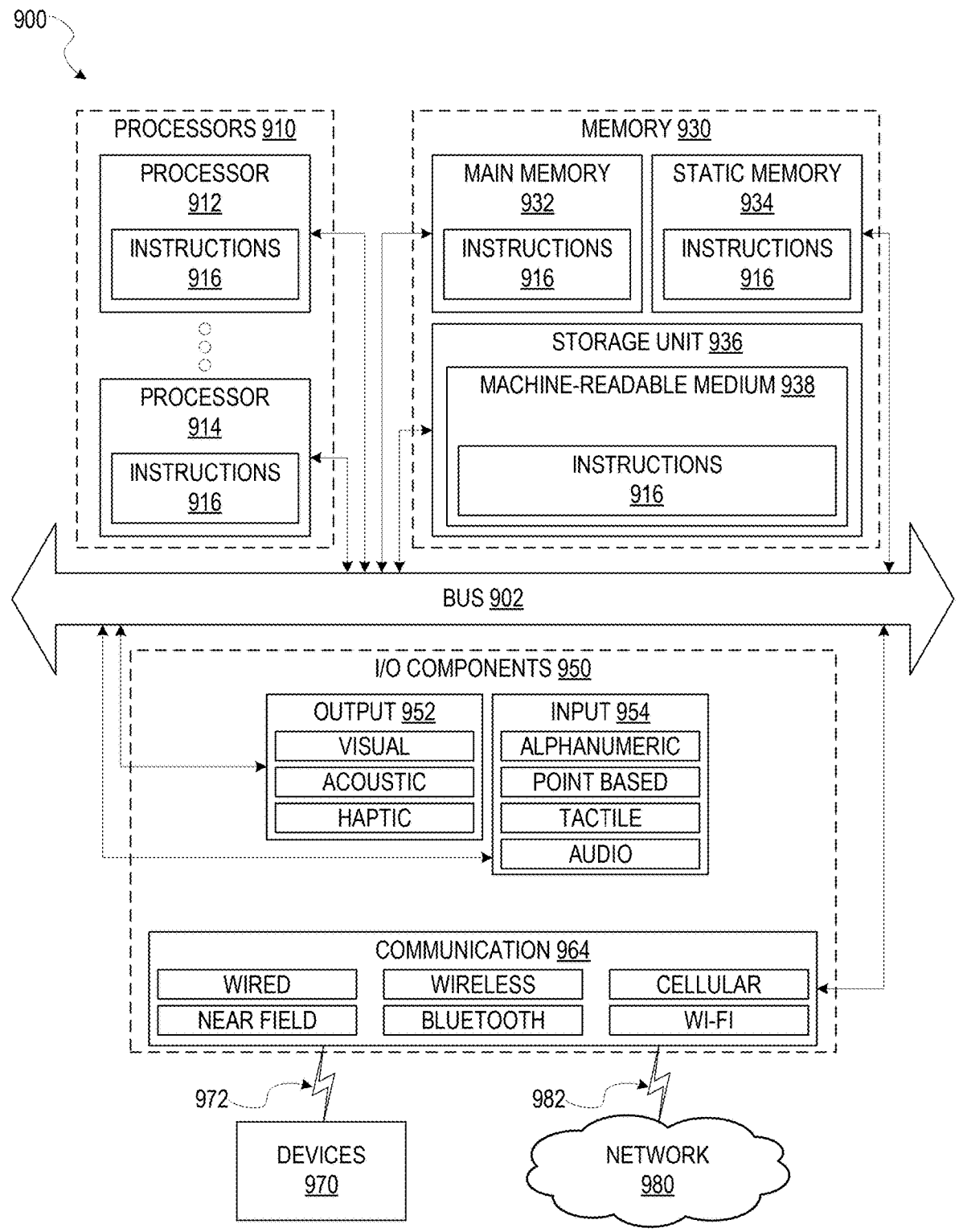
FIG. 9 is a diagram representing a machine in the form of a computer system within which a set of instructions are executed, causing the machine to perform any one or more of the methods discussed herein, according to some embodiments.

FIG. 9 is a diagrammatic representation of the machine 900 in the form of a computer system within which a set of instructions may be executed for causing the machine 900 to perform any one or more of the methodologies discussed herein, according to some embodiments. FIG. 9 shows components of the machine 900, which is, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In some embodiments, the processors 910 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute the instructions 916 contemporaneously. Although FIG. 9 shows multiple processors 910, the machine 900 may include a single processor 912 with a single core, a single processor 912 with multiple cores (e.g., a multi-core processor 912), multiple processors 910 with a single core, multiple processors 910 with multiple cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in some embodiments, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., the instructions 916) for execution by a machine (e.g., the machine 900), such that the instructions, when executed by one or more processors of the machine (e.g., the processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9.

The I/O components 950 are grouped according to functionality merely for simplifying the following discussion, and the grouping is in no way limiting. In various embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, the communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine or any of a wide variety of peripheral devices (e.g., a peripheral device coupled via a USB).

In various embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling.

Furthermore, the machine-readable medium 938 is non-transitory (in other words, not having any transitory signals) in that it does not embody a propagating signal. However, labeling the machine-readable medium 938 "non-transitory" should not be construed to mean that the machine-readable medium 938 is incapable of movement; the machine-readable medium 938 should be considered as being transportable from one physical location to another. Additionally, since the machine-readable medium 938 is tangible, the machine-readable medium 938 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Although an overview of the inventive subject matter has been described with reference to some embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
a memory storing instructions; and
a hardware processor communicatively coupled to the memory and configured by the instructions to perform operations comprising:
accessing circuit data that describes a set of layers of a circuit design, and a set of vias of the circuit design between one or more of the set of layers;
determining, based on the circuit data, a set of demands by the set of vias for the set of layers, the determining of the set of demands comprising determining, for a select via of the set of vias, a lower demand of a lower layer enclosure of the select via on a lower layer and an upper demand of an upper layer enclosure of the select via on an upper layer;
determining, based on the set of demands, a set of maximum demands by the set of vias for the set of layers; and
reducing, based on the set of maximum demands, a routing capacity of one or more grid cells of a select layer of the set of layers.

2. The system of claim 1, wherein the determining, for the select via, the lower demand of the lower layer enclosure of the select via comprises:
determining a number of tracks blocked on the lower layer by the lower layer enclosure of the select via.

3. The system of claim 1, wherein the determining, for the select via, the upper demand of the upper layer enclosure of the select via comprises:
determining a number of tracks blocked on the upper layer by the upper layer enclosure of the select via.

4. The system of claim 1, wherein the determining, for the select via, the lower demand of the lower layer enclosure of the select via comprises:
determining the lower demand by a following equation:

$$2 \times \frac{\left(\frac{EW_l}{2} + WS_l + \frac{DW_l}{2}\right)}{P_l},$$

where $EW_l$ is a width of the lower layer enclosure of the select via on the lower layer, $WS_l$ is a wire default width of the lower layer, $DW_l$ is a default width of the lower layer, and $P_l$ is a pitch of the lower layer.

5. The system of claim 1, wherein the determining, for the select via, the upper demand of the upper layer enclosure of the select via comprises:
determining the upper demand by a following equation:

$$2 \times \frac{\left(\frac{EW_l}{2} + WS_l + \frac{DW_l}{2}\right)}{P_l},$$

where $EW_l$ is a width of the upper layer enclosure of the select via on the upper layer, $WS_l$ is a wire default width of the upper layer, $DW_l$ is a default width of the upper layer, and $P_l$ is a pitch of the upper layer.

6. The system of claim 1, wherein the determining, based on the set of demands, the set of maximum demands by the set of vias for the set of layers comprises:
determining the set of maximum demands by determining, for each individual layer of the set of layers, a largest demand of all enclosures of vias on the individual layer.

7. The system of claim 1, wherein the reducing, based on the set of maximum demands, the routing capacity of one or more grid cells of the select layer of the set of layers comprises:
reducing, based on the set of maximum demands, the routing capacity of one or more grid cells of the select layer of the set of layers and of an additional layer of the set of layers disposed above the select layer.

8. The system of claim 1, wherein the reducing, based on the set of maximum demands, the routing capacity of one or more grid cells of the select layer of the set of layers comprises:
reducing, based on the set of maximum demands, the routing capacity of one or more grid cells of the select layer of the set of layers and of all layers of the set of layers disposed above the select layer.

9. The system of claim 1, wherein the reducing, based on the set of maximum demands, the routing capacity of one or more grid cells of the select layer of the set of layers comprises:
determining a select routing capacity of a select grid cell of the select layer by a following equation:

$$\max(C_l - TB_l \times CPT_l \times F_l, CPT_l),$$

where $C_l$ is a present value of the select routing capacity of the select grid cell in the select layer, $TB_l$ is a maximum demand from the set of maximum demands corresponding to the select layer, $F_l$ is a modeling factor for deciding how much demand to block in the select layer, and $CPT_l$ is a routing capacity per track in the select layer.

10. The system of claim 9, wherein the modeling factor is user-defined.

11. The system of claim 1, wherein the operations are performed prior to a detailed routing process.

12. The system of claim 11, wherein the operations are performed as part of a global routing process.

13. A non-transitory computer-readable medium comprising instructions that, when executed by a hardware processor of a device, cause the device to perform operations comprising:
accessing circuit data that describes a set of layers of a circuit design, and a set of vias of the circuit design between one or more of the set of layers;
determining, based on the circuit data, a set of demands by the set of vias for the set of layers, the determining of the set of demands comprising determining, for a select via of the set of vias, a lower demand of a lower layer enclosure of the select via on a lower layer and an upper demand of an upper layer enclosure of the select via on an upper layer;

determining, based on the set of demands, a set of maximum demands by the set of vias for the set of layers; and reducing, based on the set of maximum demands, a routing capacity of one or more grid cells of a select layer of the set of layers.

14. The non-transitory computer-readable medium of claim 13, wherein the determining, for the select via, the lower demand of the lower layer enclosure of the select via comprises:

determining a number of tracks blocked on the lower layer by the lower layer enclosure of the select via.

15. The non-transitory computer-readable medium of claim 13, wherein the determining, for the select via, the upper demand of the upper layer enclosure of the select via comprises:

determining a number of tracks blocked on the upper layer by the upper layer enclosure of the select via.

16. The non-transitory computer-readable medium of claim 13, wherein the determining, for the select via, the lower demand of the lower layer enclosure of the select via comprises:

determining the lower demand by a following equation:

$$2 \times \frac{\left(\frac{EW_l}{2} + WS_l + \frac{DW_l}{2}\right)}{P_l},$$

where $EW_l$ is a width of the lower layer enclosure of the select via on the lower layer, $WS_l$ is a wire default width of the lower layer, $DW_l$ is a default width of the lower layer, and $P_l$ is a pitch of the lower layer.

17. The non-transitory computer-readable medium of claim 13, wherein the determining, for the select via, the upper demand of the upper layer enclosure of the select via comprises:

determining the upper demand by a following equation:

$$2 \times \frac{\left(\frac{EW_l}{2} + WS_l + \frac{DW_l}{2}\right)}{P_l},$$

where $EW_l$ is a width of the upper layer enclosure of the select via on the upper layer, $WS_l$ is a wire default width of the upper layer, $DW_l$ is a default width of the upper layer, and $P_l$ is a pitch of the upper layer.

18. The non-transitory computer-readable medium of claim 13, wherein the determining, based on the set of demands, the set of maximum demands by the set of vias for the set of layers comprises:

determining the set of maximum demands by determining, for each individual layer of the set of layers, a largest demand of all enclosures of vias on the individual layer.

19. The non-transitory computer-readable medium of claim 13, wherein the reducing, based on the set of maximum demands, the routing capacity of one or more grid cells of the select layer of the set of layers comprises:

determining a select routing capacity of a select grid cell of the select layer by a following equation:

$$\max(C_l - TB_l \times CPT_l \times F_l, CPT_l),$$

where $C_l$ is a present value of the select routing capacity of the select grid cell in the select layer, $TB_l$ is a maximum demand from the set of maximum demands corresponding to the select layer, $F_l$ is a modeling factor for deciding how much demand to block in the select layer, and $CPT_l$ is a routing capacity per track in the select layer.

20. A method comprising:

accessing, by a hardware processor, circuit data that describes a set of layers of a circuit design, and a set of vias of the circuit design between one or more of the set of layers;

determining, by the hardware processor and based on the circuit data, a set of demands by the set of vias for the set of layers, the determining of the set of demands comprising determining, for a select via of the set of vias, a lower demand of a lower layer enclosure of the select via on a lower layer and an upper demand of an upper layer enclosure of the select via on an upper layer;

determining, by the hardware processor and based on the set of demands, a set of maximum demands by the set of vias for the set of layers; and reducing, by the hardware processor and based on the set of maximum demands, a routing capacity of one or more grid cells of a select layer of the set of layers.

* * * * *